US011684043B2

(12) United States Patent
Hill

(10) Patent No.: US 11,684,043 B2
(45) Date of Patent: Jun. 27, 2023

(54) DOGGIE POOP SADDLE

(71) Applicant: Arnett La'Rouge Hill, La Mesa, CA (US)

(72) Inventor: Arnett La'Rouge Hill, La Mesa, CA (US)

(*) Notice: Subject to any disclaimer, the term of this patent is extended or adjusted under 35 U.S.C. 154(b) by 0 days.

(21) Appl. No.: 17/031,695

(22) Filed: Sep. 24, 2020

(65) Prior Publication Data
US 2021/0092938 A1 Apr. 1, 2021

Related U.S. Application Data

(60) Provisional application No. 62/906,163, filed on Sep. 26, 2019.

(51) Int. Cl.
*A01K 27/00* (2006.01)

(52) U.S. Cl.
CPC .......... *A01K 27/002* (2013.01); *A01K 27/008* (2013.01)

(58) Field of Classification Search
CPC .................. A01K 27/0002; A01K 27/008
See application file for complete search history.

(56) References Cited

U.S. PATENT DOCUMENTS

| | | | |
|---|---|---|---|
| 5,297,835 A * | 3/1994 | Wengler | B63H 20/36 294/157 |
| 5,560,321 A * | 10/1996 | Hess | A01K 27/006 119/858 |
| 5,586,521 A | 12/1996 | Kelley | |
| 5,887,772 A * | 3/1999 | Dooley | A01K 27/008 119/858 |
| 6,257,473 B1 | 7/2001 | Ringelsterrer | |
| 7,367,286 B2 | 5/2008 | Beaupre | |
| 7,370,608 B1 * | 5/2008 | Friedman | A01K 13/006 119/856 |
| 7,918,192 B1 * | 4/2011 | Digh | A01K 27/006 119/850 |
| 2019/0297845 A1 * | 10/2019 | Gilbert | A01K 13/008 |

* cited by examiner

Primary Examiner — Kristen C Hayes

(57) ABSTRACT

The present invention, Doggie Poop Saddle, involves a one-piece item (saddle) which fits over the back of a dog. This harness is designed with two large pockets which hang on each side of the dog's rib cage, a front neck strap and a back-end strap. The saddle pockets will hold poop collected by the person walking the dog. The walker can retrieve a plastic bag from the "slit" pocket located in the middle of the one-piece saddle on top of the dog's back. This invention frees up the walker from carrying an unsanitary and smelly bag of dog poop by hand for the entire walk. It also provides a vehicle by which the dog walker can help keep the neighborhood and the walking area free of dog poop. This Doggie Poop Saddle can be made to fit small, medium and large dogs.

5 Claims, 2 Drawing Sheets

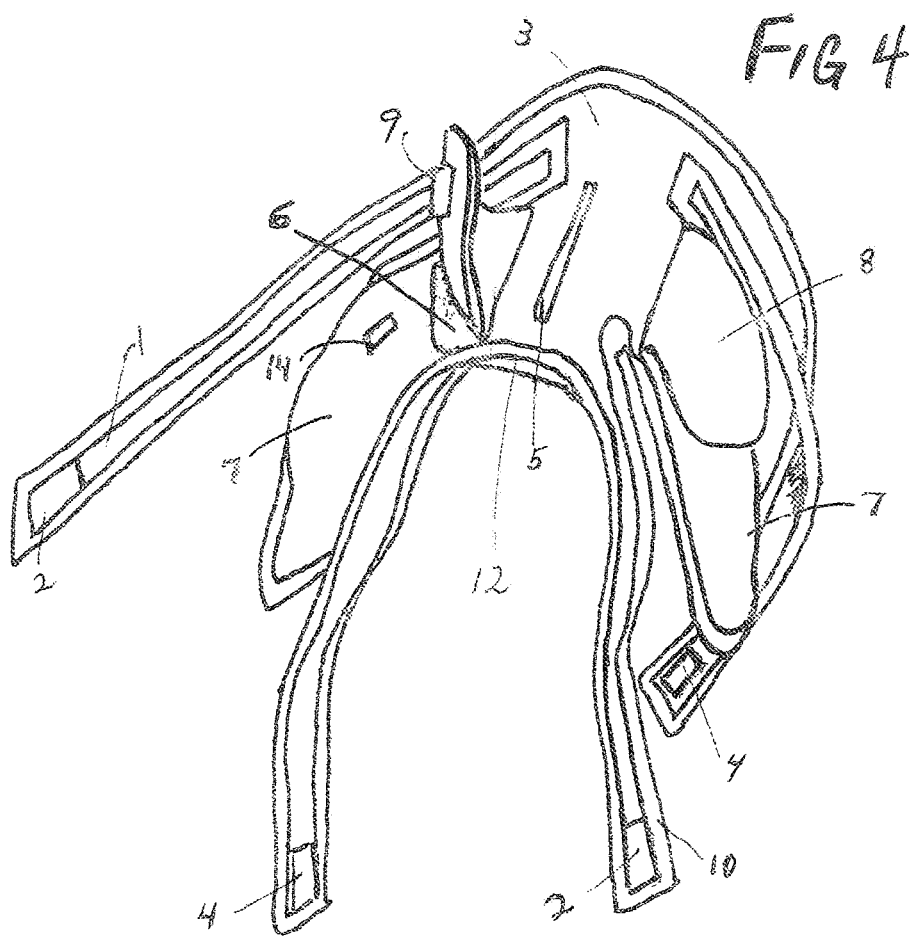

DOGGIE POOP SADDLE

FIELD OF INVENTION

This invention is designed for the dog to carry its own excrement deposited while the pet is on a walk with the owner or during other events. The invention is a saddle, cut in a continuous format with neck straps and two hind straps designed to fasten with Velcro around the neck and lower belly of the dog. The saddle is carefully constructed of a quilted, batting-filed, microfiber fabric which lays over the back of the dog, and features two large pockets with locking flaps which hand on each side of the dog's rib cage and a "slit pocket" to hold and dispense plastic bags as needed for use to pick up the poop. The Doggie Poop Saddle is washable and can be sanitized.

BACKGROUND OF THE INVENTION

The majority of pets walked by their owner is a dog. During the experience of walking a dog there will be a moment where the dog will have to poop. The owner/walker of the pet will need to pick up the poop in a plastic bag. Many states, local and city governments also require pet owners to clean up after their pets who have deposited fecal matter on sidewalks, streets, grass knolls, parks, and other thorough fares. As of now, most pet owners will take plastic bags with them to collect the poop along the route. But often times there is no waste container along the route to deposit the poop so the owners carry it, by hand, during the entire walk.

This is where the Doggie Poop Saddle becomes a handy product for dog owners. They can deposit the waste in the Poop Saddle Pockets worn by the dog and close the cover flaps. Thus, the owner will not have to carry the poop bag and endure the unpleasant odor which will exude from the plastic bag after a period of time. Also, using the poop pockets frees the owner's hands to provide better control of the pet.

The Doggie Poop Saddle is designed to be lite weight, easy, quick and simple to use, for example, one only has to pull a plastic bag from the handy "split pocket" on top of the saddle, pick up the poop with one hand inside the plastic bag, pull the bag inside out and tie a knot in the bag; drop the bag inside the large poop pocket, close the flap, and continue on the journey.

Prior Art, Ringelstetter, shows a product for animal waste that is constructed in the form of an upright pouch with numerous compartments, hooks and loops designed for other items to carry during the walk as well as the dog poop. The poop is contained in the upper chamber, in a plastic bag, with a lid cover. Additionally, the dog owner/walker still carries the dog waste in the pouch during the walk around his waistline. The current invention (Doggie Poop Saddle) is designed for the dog to carry its own poop enclosed in large side pockets covered with a locking flap. The Doggie Poop Saddle is washable and can be sanitized.

Prior Art, Beaupre, shows an implement for carrying dog poop while using a leash. The container includes an attachment portion wherein the waste receiving unit contains four walls with lower and upper openings. Upper openings receives the wastes and lower openings releases the waste therethrough. The opening and closing configurations of the unit are very complicated all while being controlled with a leash and somehow the trap frees the opening. There again, the present invention (Doggie Poop Saddle) serves to make the collection of poop a simple, easy and quick task while walking the dog. One only has to pull a plastic bag from the top of the saddle on the dog's back, place one hand in the bag, pick up the poop, pull the bag inside out, tie a knot and place the bag in the large poop pockets on the side of the dog's, and close and lock the flap.

BACKGROUND OF THE INVENTION

Prior Art, Kelley, shows a combination scoop-container for use by animal owners. The container is detachable for use as a scoop in combination with a small shovel to collect the waste. The container has an angled open end covered by a pivotable lid. This container attaches to the harness on the dog and the shovel is used to scoop the poop and place it in the container. While the container combination scoop-poop with shovel sounds good, it does not seem to have a lining for the container for the poop. Shoveling poop in a plastic or metal container without some type of lining for the unit, will cause a real cleaning mess for the owner/walker, and not to mention the smelly odor the poop will exude. The Present Art, Doggie Poop Saddle, also has a harness which differs from the Prior Art by its attachment to the body of the dog.

The Present Art attaches to a dog by two neck straps and two hind straps which closes underneath and near the hind legs of the dog. The Prior Art was designed for the dog to carry its own poop, however, the harness does not provide neck straps or hind straps. It provides a harness with two bands which surrounds the total circumference of the body where the container clips to the harness. The Present Art provides two large pockets located on each side of the dogs rib cage, and a "slit pocket" on top of the harness located on the dog's back. When the dog's owner/walker needs to pick up poop, they can quickly grab a plastic bag from the "slit pocket", place one hand in the plastic bag, pick up the poop, turn the bag inside out, tie a knot in the plastic bag, and place it in the large side pocket and close the flap and lock it with the Velcro closure. When its time to empty the pocket, they open the flap and remove the plastic bags and place them in the trash. The Doggie Poop Saddle is washable and can be sanitized.

SUMMARY OF THE INVENTION

This invention provides a product in the form of a saddle (one piece) designed to hold poop in two large pockets with flaps which hang on each side of the dog's rib cage. Each flap closes with a Velcro fastener.

The person walking the dog can retrieve a useable plastic bag from the Slit Pocket designed in the saddle and located on the dog's back between the two large poop pockets. As the need arises, the owners remove a plastic bag from the Slit Pocket, insert his/her hand inside the bag, pick up the poop with one hand inside the bag and turn the bag inside out to hold the poop, tie a knot in the bag and insert it in the large poop pockets, closes the flaps and lock them with the velcro fastener. Upon reaching their return home, the owner will empty the poop pockets, sanitize the saddle with a purchased sanitizer which will leave it ready for the next walking trip or wash it.

The Doggie Poop Saddle which is designed as a one piece entity is attached to the dog with four straps, two for the animal's neck and two for the rear of the animal's body. The pattern is designed so that the front of the saddle is easily discernible from the back of the saddle. The straps for the front have the shortest distance from the saddle to the neck, and the straps for the back of the animal have the longest distance from the saddle to the back of the animal. The front strap easily fits around the neck of the animal and it is fastened with the Velcro closure. The rear straps close in the same manner. They wrap around the full body of the animal and closes with the Velcro fastener underneath the belly of the dog near the hind legs.

The saddle will not in any way be uncomfortable for the pet. The straps are designed so that they can be adjusted to fit snugly but not too tight. And the dog will only carry the poop and the plastic bags.

BRIEF DESCRIPTION OF THE DRAWINGS

FIG. 2. Also depicts the large poop pockets which is the main portion of the invention and the harness along with construction of the pocket flaps, and pocket closures.

FIG. 4. Is an overall perspective look at the Doggie Poop Saddle with the illustrated features of the invention.

DETAILED DESCRIPTION OF THE INVENTION

Figure 1:
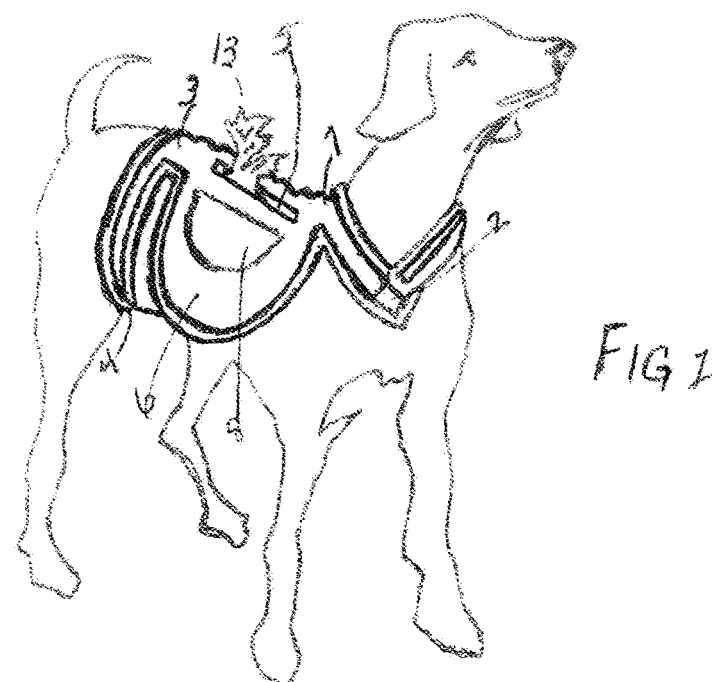
FIG. 1. is a perspective view of one side of the Doggie Poop Saddle worn by a dog. This view displays one of the two pockets with flaps located on each side of the dog's rib cage. Also shown in FIG. 1 is the "slit pocket" located on top of the dog's back between the two side pockets to hold plastic bags. In further observance, the saddle is showing front neck straps which close around the dog's neck as well as back hind straps which connect underneath the dog's belly.

FIG. 1 is a side view of the one-piece saddle uniquely constructed by sewing a medium weight fabric with microfiber batting filler cut on a double fold to provide weight for the saddle. The pattern is designed as a one-piece harness touting (1) neck straps for attachment around the dog's neck; (2) a Velcro closure to secure the neck strap; (3) back straps for circling the underbelly of the dog near the hind legs; (4) Velcro closure to secure the back straps; (5) an open "slit pocket" located on the back of the dog's saddle; (6 & 7) two main pockets with flaps located on each side of the dog's rib cage to hold the poop. (#7 pocket is showing on FIG. 4). And (8) the pocket flap showing the (9) Velcro closure. The (13) plastic bags are dispensed from the slit (5) for the use to pick up the poop.

Figure 2:
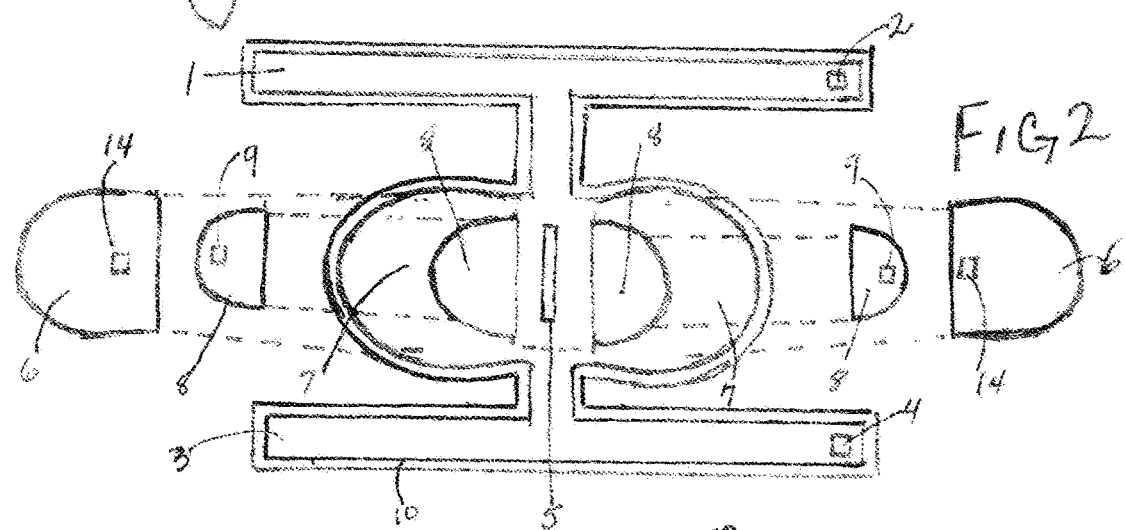
FIG. 2. is the overall layout of the one-piece invention (poop saddle) with the following items included in the pattern cut: the neck strap with Velcro closure, the back-end strap with Velcro closure, the slit pocket found in the middle of the one-piece invention located on top of the dog's back.

FIG. 2 shows the overall top pattern layout of the one-piece saddle (1) with the neck strap included in the cut of the one piece saddle and closes around the neck of the dog with a manufactured (2) Velcro closure, and (3) a back-end strap included in the cut of the one-piece saddle which closes around and under the dog's belly near the rear legs. The strap locks with a manufactured (4) velcro closure. The invention provides a (5) "slit" pocket in the middle of the one-piece saddle located on top of the dog's back between the two (6 & 7) large side saddle pockets located on each side of the dog's rib cage. The "slit pocket" is long and wide enough to allow for easy removal of the plastic bags.

The large poop pockets are included as part of he overall cut of the one-piece saddle pattern with double fabric. However, two additional cuts are made for (6) cover pockets to fully develop the two pockets on each side of the saddle. The cover pockets are folded along the top edge and stitched, then placed face down on the main pattern and stitched around the edges, thus, developing the poop pockets. (7) The large poop pockets are the major part of the one-piece saddle. These large poop pockets hang on each side of the dog's rib cage. The (8) flaps, that cover the large poop pockets (two of them) are cut on double folded fabric, stitched right sides together, tuned rights sides out, pressed and folded on the open end by ⅝ inch, then stitched above the large poop pockets allowing approximately one-inch space on each side of the large poop pockets before stitching the flap to the main item. (9) The two flaps close with a manufactured closure. (10) The one-piece saddle (FIG. 1 & FIG. 4) are competed by stitching a bias binding around the total circumference of the item.

Figure 3:
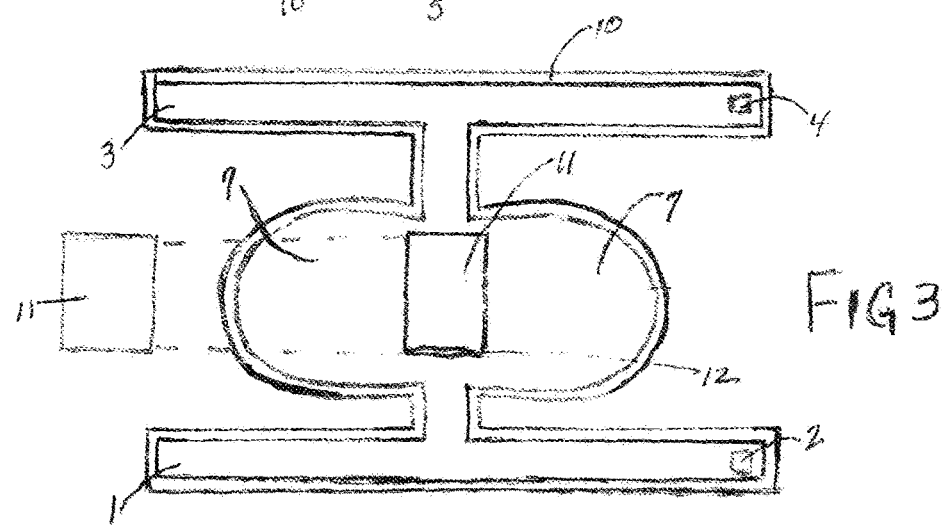
FIG. 3. is the layout of the two pockets underneath the main pattern pockets along with a "blow up of the "slit pocket" located in the middle of the harness on the dog's back. This "slit pocket" is designed to hold unused plastic bags for poop. The entire circumference of the Doggie Poop Saddle is finished with manufactured bias binding tape using different colors.

FIG. 3 of the one-piece saddle shows the pattern layout of the (11) pocket underneath the saddle which holds the plastic bags. The (12) opening of the pocket will receive the (13) plastic bags until one is ready to be pulled out by the dog walker. The pocket opening is finished with manufactured (14) bias binding around the total opening of the pocket.

FIG. 4 is an overall perspective look of the Doggie Poop Saddle with the Illustrated features of the invention.

I claim:

1. A dog waste saddle, comprising a medium fabric cut on a double fold continuous one-piece pattern layout, fits over the back of a dog, comprising: two large primary pockets with cover flaps, capable of being placed with one on each side of said dog's rib cage; said pockets being formed within said continuous one-piece pattern cut wherein the underside of first primary pocket can touches the body of animal on one side; and wherein the underside of second primary pocket can touch the body of animal on opposite side, said two primary pockets are used to transport animal waste; said saddle comprises a flexible slit pocket opening located on top of saddle on back of said animal to hold extra plastic litter bags; said slit pocket opening is designed wherein an extra layer of fabric is stitched underneath the flexible opening allowing bags to be easily retrieved through flexible slit, as needed, by use of one's hand, and two overlapping body straps cut within said continuous one-piece double pattern layout for attachment of saddle to said animal's front area and back torso areas.

2. A dog waste saddle according to claim 1 further comprising outside cover pockets for attachment to said two primary pockets thus developing complete pockets on both sides of said saddle wherein ample depth is established to hold animal waste; said cover pockets are joined to primary pockets by stitching from top of one side of said cover pockets encompassing total said pockets to opposite side; said outside cover pockets display a locking mechanism of wiry interlocking material on outside to secure pockets to flaps.

3. A dog waste saddle according to claim 1, further comprising two outside pocket cover flaps to be attached to main saddle above each said primary pocket, wherein said pocket flaps attach to said saddle by stitching pocket flaps into main saddle fabric above said primary pockets; pocket flaps lock to primary pockets by contact with wiry interlocking fittings located underneath pocket flaps.

4. A dog waste saddle, according to claim 1, further comprising overlapping front straps cut within the continuous one-piece pattern, wherein said straps are able to secure said saddle to front body of animal's neck and chest areas; and the straps lock by pressing matching wiry interlocking fittings together; wherein strap length is adjustable along the length of the locking mechanism located on the straps.

5. A dog waste saddle, according to claim 1, further comprising overlapping back straps cut within the continuous one-piece pattern, wherein said straps are capable of securing said saddle to back of abdomen area of animal by circling straps underneath back abdomen area near hind legs of animal; and said body straps attach to each other by pressing wiry interlocking fittings together.

* * * * *